July 10, 1934.　　　W. MYERS ET AL　　　1,965,965
SIDE LOADING HEARSE
Original Filed Aug. 7, 1926　　5 Sheets-Sheet 1
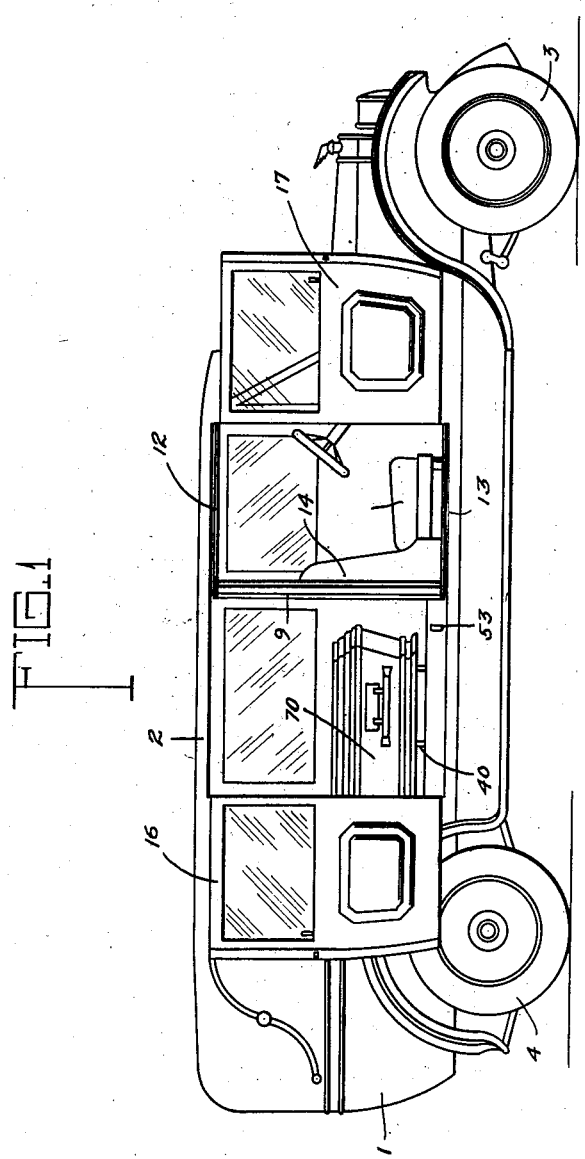
INVENTORS
Wilbur Myers and
Frank Thomas,
BY Walter N. Haskell.
their ATTORNEY.

July 10, 1934.  W. MYERS ET AL  1,965,965
SIDE LOADING HEARSE
Original Filed Aug. 7, 1926   5 Sheets-Sheet 2
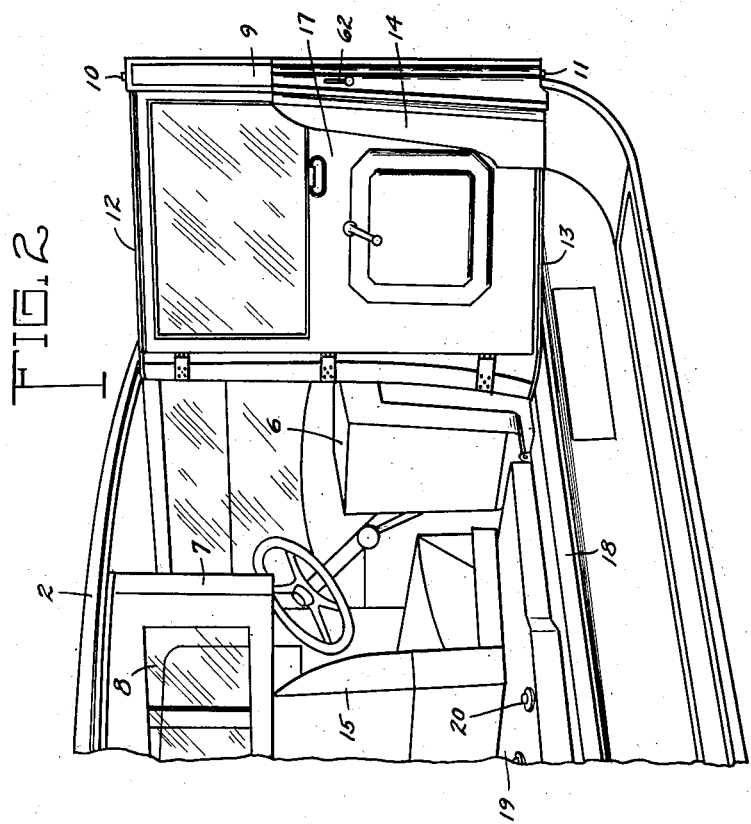
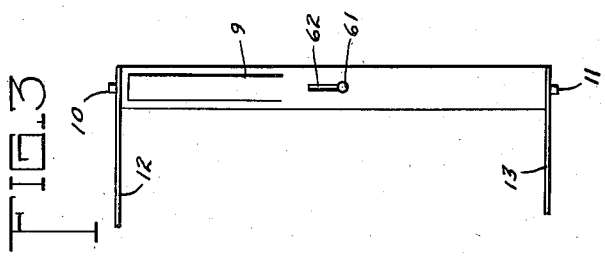
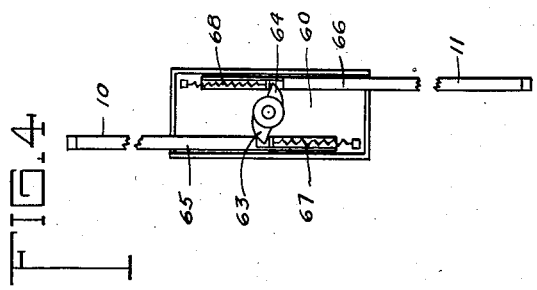
INVENTORS
Wilbur Myers and
Frank Thomas.
BY Walter N. Haskell,
their ATTORNEY.

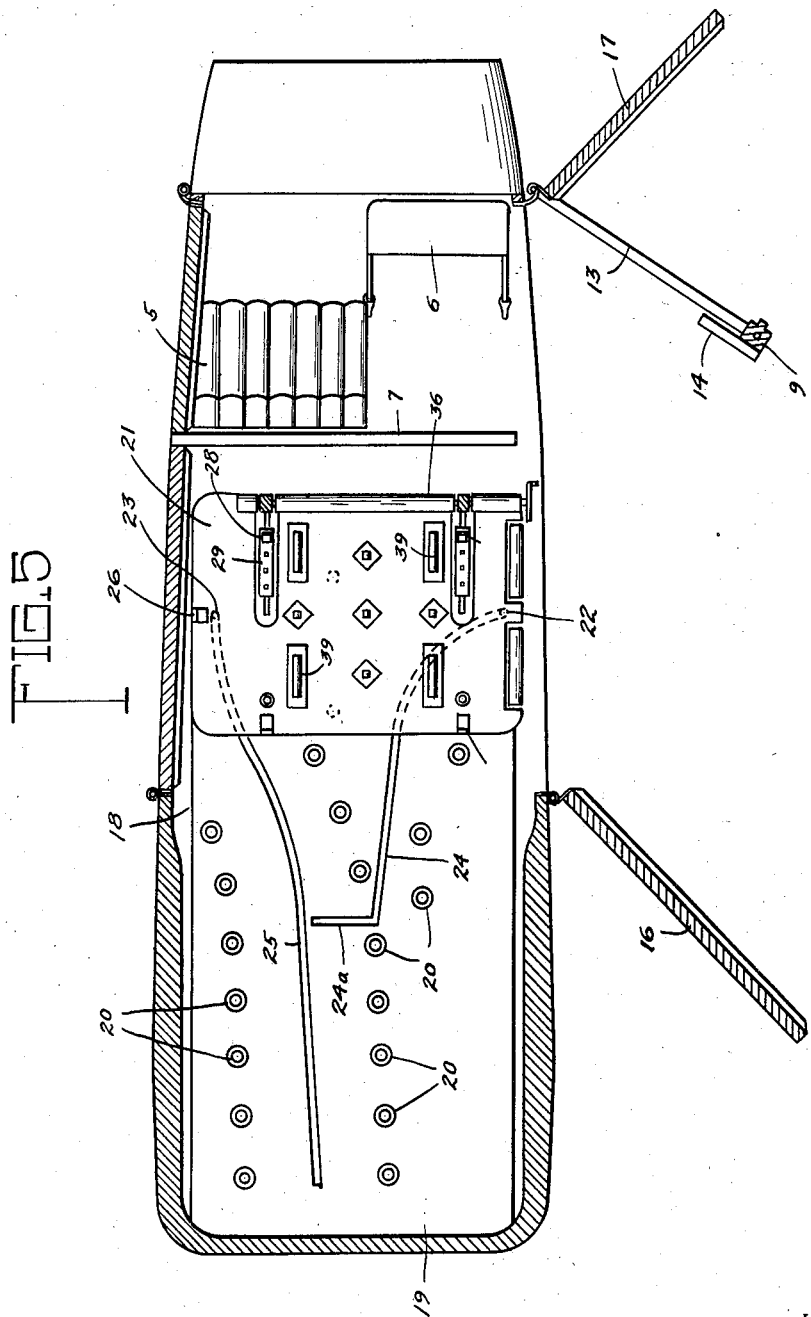

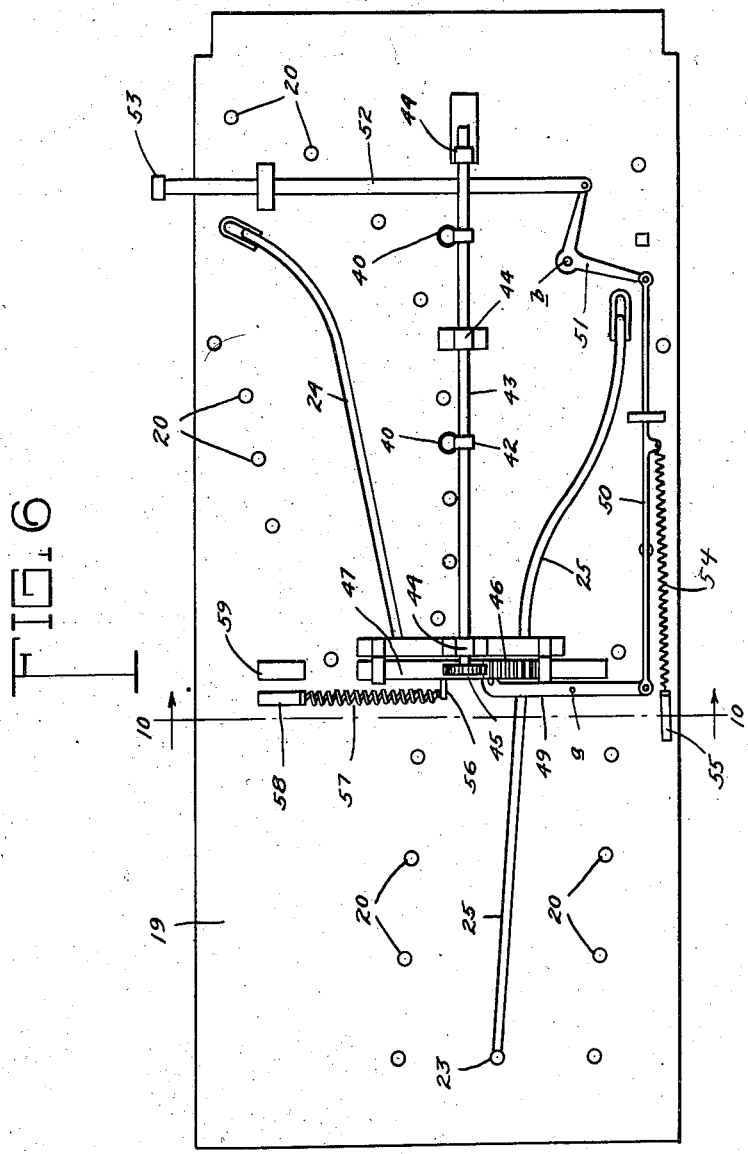

July 10, 1934. W. MYERS ET AL 1,965,965
SIDE LOADING HEARSE
Original Filed Aug. 7, 1926  5 Sheets-Sheet 5
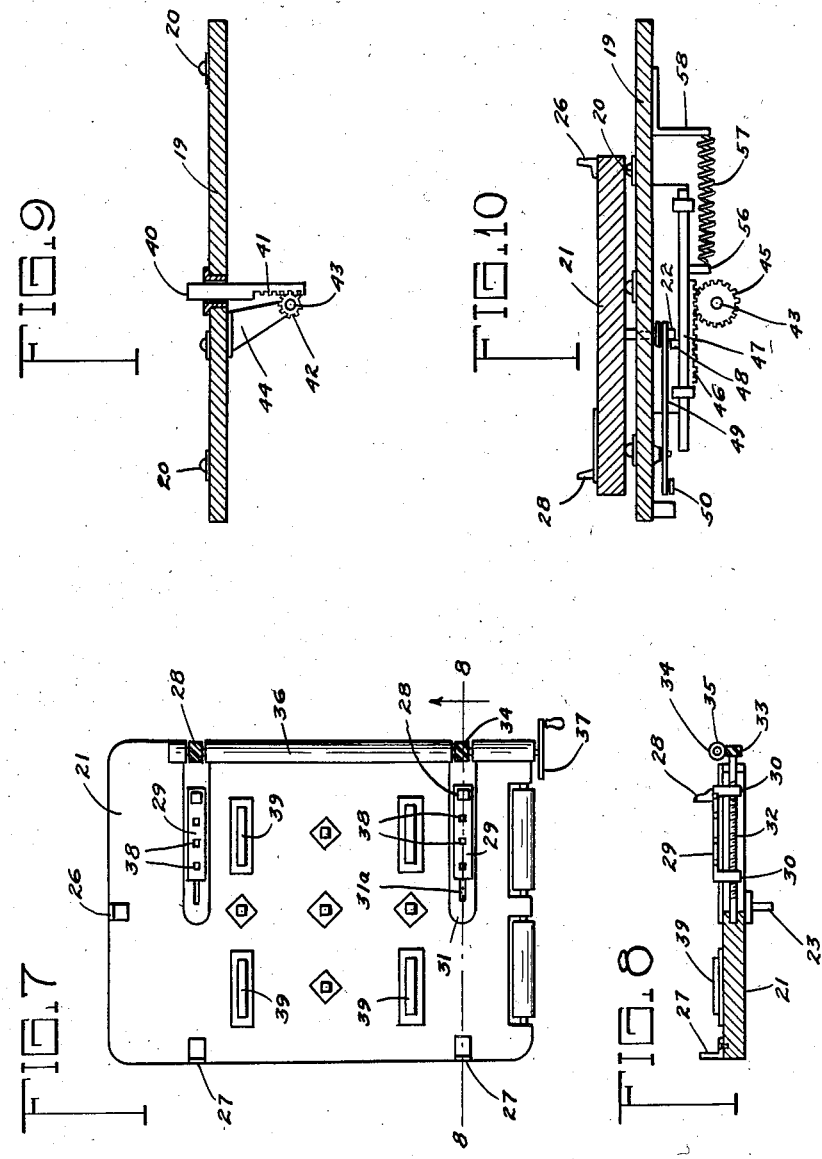

Patented July 10, 1934

1,965,965

UNITED STATES PATENT OFFICE 1,965,965

SIDE LOADING HEARSE

Wilbur Myers, Prairieville, and Frank Thomas, Sterling, Ill., assignor, by mesne assignments, to Big Rock Ranch Company, Los Angeles, Calif., a corporation of California Original application August 7, 1926, Serial No. 127,851. Divided and this application February 21, 1927, Serial No. 169,776. Renewed February 12, 1932

6 Claims. (Cl. 296—16)

Our invention has reference to side-loading hearses, and has for its chief purpose to provide a vehicle of that type having a side opening and closure therefor, through which opening a casket containing a body can be introduced into the hearse or removed therefrom. This application is a division of our former application filed Aug. 7, 1926, Serial No. 127,851, for a similar device, relating to certain parts of the invention therein not involved in interference cases now pending.

Another purpose thereof is to provide a carrier or truck for the casket upon which the casket may be placed transversely of the hearse and by the use of which such casket can be moved into the hearse, and into a position longitudinally thereof.

Another object of the invention is to provide means for holding the truck and casket in place in the hearse, such means being operated automatically by said truck and its load upon reaching the end of its inward movement. Associated with said means is mechanism for the release thereof, including stored-power devices for giving an initial movement to the truck and its load upon being released.

Another feature of the invention consists in a novel arrangement of the vehicle so as to allow sufficient clearance room for the casket in moving the same into or out of the hearse.

The above named and other features and advantages of the invention will more fully appear from the following specification, taken in connection with the accompanying drawings, in which:—

Fig. 1 is a side elevation of a vehicle equipped with the invention, with the side thereof open, and a casket shown in position therein.

Fig. 2 is a fragmentary view of the front end of the vehicle, in perspective.

Fig. 3 is a view of the post 9, detached.

Fig. 4 is a detail of the latch mechanism in the post 9.

Fig. 5 is a plan view of the bed of a vehicle equipped with the invention, with the casket truck in position thereon.

Fig. 6 is an inverted plan view of the table 19, and mechanism beneath the same.

Fig. 7 is an enlarged view of the truck 21.

Fig. 8 is a cross-section on the broken line 8—8 of Fig. 7.

Fig. 9 is a cross section of the table 19 on the line of one of the pins 40.

Fig. 10 is a cross-section on the broken line 10—10 of Fig. 6, with the parts in reverse position.

Referring first to Figures 1 and 2, the reference number 1 indicates the body of a vehicle of hearse pattern, 2 the top thereof, and 3 and 4 the carrying wheels therefor. In the front part of the vehicle is a driver's seat 5, at the side of which is an auxiliary seat 6, hinged so as to be capable of being tipped forwardly, as shown in Fig. 2, the back of said seat being also hinged so as to fold down against the seat in a well-known manner. Above the backs of said seats is a partition 7, having an opening closed by sliding panels, as at 8.

At the outer end of the seat 6 is a post 9, held removably in place by bolts 10 and 11 at the upper and lower ends thereof, respectively, and arranged and operated in the manner hereinafter set forth. Upon being detached the post 9 is swingingly supported by a pair of metal arms 12 and 13 secured to the upper and lower ends of said post, and having a pivotal connection with brackets attached to the upper and lower portions of the vehicle frame. To the inner face of the post 9 is attached an end-piece 14 for the seat 6, corresponding with an end-piece 15 at the inner end of the seat 5. (Fig. 2.)

In rear of the post 9 is an opening in the side of the vehicle, normally closed by a door 16, hinged to the body of the vehicle so as to swing rearwardly, as shown in Fig. 1. At the side of the seat 6 is another opening, closed by a door 17, hinged to the frame so as to swing forwardly, as shown in said figure. The pivots of the hinges of the door 17 and the arms 12 and 13 are in line vertically, so that the post can be swung outwardly with the door if desired. Said door is provided on its outer face with a double jamb, against which the outer edges of the doors 16 and 17 close, and said edges are provided with latches for holding the doors in closed position after the usual manner of such vehicle doors. Upon the door 16 being opened the door 17 and post 9 swung outwardly, as shown in Fig. 2, and the seat 6 tipped forwardly, an opening is provided in the side of the vehicle, and beneath the projecting end of the partition 7, to permit of the movement of a casket of usual proportions into or out of the vehicle, in the manner hereinafter more fully set forth.

The vehicle is fitted with a floor 18 upon which is supported a table 19, provided with a plurality of ball rollers 20, upon which is movable a truck 21, adapted to receive and hold one end of a casket. At the ends of said truck are downwardly projected pins 22 and 23, operable, respectively, in slots 24 and 25 in the table 19.

Such slots serve as guides for the pins, directing the truck from a receiving position transversely of the table, as shown in Fig. 5, to a longitudinal position in the rear end of the vehicle. In the initial movement the pin 23 follows an arcuate track, with the pin 22 as a center, and then as the pin 23 moves rearwardly in the main part of the slot 25 the pin 22 follows in the slot 24. Upon the pin 23 reaching the rear end of the slot 25 the pin 22 is given a transverse movement in a lateral 24ª of the slot 24, bringing the pins 22 and 23 into substantial alignment, with the truck and casket supported thereby in position at one side of the vehicle, in rear of the seat 5. In the removal of the casket this operation is reversed, swinging the casket from a longitudinal position to a position transversely of the vehicle, and projecting from the vehicle so as to be easily engaged for removal.

At the inner end of the truck 21 is fixed a stop 26, limiting the inward movement of a casket placed thereon, and at one side of the truck are similar stops 27. (Fig. 7.) Opposite to the stops 27 are clamp-pins 28, supported in plates 29, and provided with downward projections 30 slidable in slots 31 in said plates. Said projections have threaded openings to receive similarly threaded shafts 32, on the outer ends of which are worm-gears 33, adapted for driving by worm-wheels 34 on a shaft 35 rotatably mounted in a sleeve 36 fixed to the edge of the truck 21. At the outer end of the shaft 35 is a small crank 37 by means of which the same may be rotated, and by the rotation thereof the shafts 32 can be revolved to bring the pins 28 into engagement with a casket held on the truck, and assist in holding the same in place. The clamp-pins are capable of adjustment laterally of the truck by means of series of openings 38 in the plates 29, with any one of which said pins may be engaged. By this means said pins may be accommodated to caskets of varying sizes. The upper face of the truck is also provided with friction rollers 39, upon which the casket will move freely.

The length of the truck is such as to support substantially one-half of a casket of standard dimensions, and when the casket is in position for transportation in the vehicle the projecting end thereof is sustained by a pair of pins 40 movable vertically in openings in the table 19, and provided at their lower ends with rack teeth 41, engaged by the teeth of pinions 42 on a shaft 43 journalled in bearings 44 fixed to the lower face of the table 19, said table being spaced a sufficient distance above the floor 18 to accommodate said devices. On the rear end of the shaft 43 is fixed a toothed wheel 45, the teeth of which are in mesh with those of a rack 46 on the lower side of a bar 47, slidably supported beneath the table 19. (Fig. 10.) Projecting upwardly from said bar is a pin 48, in the line of movement of the lower end of the pin 22 as it travels in the lateral 24ª. In this movement of the pin 22 the pin 48 is engaged thereby, causing the bar 47 to move in a direction to rotate the shaft 43, elevating the pins 40 until the upper ends thereof are in the same plane with the upper face of the truck 21, and in contact with the bottom of the casket, as shown in Fig. 1. By this means the projecting end of the casket is steadied, and kept from getting out of place while the vehicle is in motion.

The pin 22 is held in place at the inner end of the slot by means of a lever 49, having a pivotal connection with the lower face of the table 19 as at $a$, and provided at its inner end with a catch for engagement with the pin, which catch engages with the pin automatically. Pivoted to the outer end of the lever 49 is a rod 50, the forward end of which has a pivotal connection with a bell-crank lever 51, fulcrumed to the table at $b$, a rod 52 being connected with the other arm of said lever and projecting outwardly beyond the edge of the table in rear of the post 9, the end of said rod being formed into a handle 53. By pulling said last-named rod outwardly the lever 51 is released from engagement with the pin 22. A coiled spring 54 connects the rod 50 with a bracket 55, fixed to the table 19, the force of said spring tending to hold the lever 49 in engagement with the pin 22. Projecting from the bar 47 is a pin 56 to which is attached one end of a coiled spring 57, the other end of which is secured to a bracket 58 fixed to the lower face of the table 19. Upon the bar 47 being actuated by the pin 22 the coils of said spring are extended, and upon said pin being released by the lever 49 the force of the spring returns said bar to its former position. This movement carries the pin 22 outwardly, together with the truck 21 and load thereon, the impetus thereof tending to move the truck toward the front of the table 19 and turn the same into a position with the casket projecting through the side of the hearse, in position to be removed. Said movement of the bar 47 also rotates the shaft 43 in a direction to move the pins 40 downwardly, disengaging the same from the casket.

The operation of the bolts which hold the post 9 in place in the door frame is by means of mechanism contained within the post, consisting of a casing 60, (Fig. 4) in which is pivoted a shaft 61, projecting beyond the face of the post, and provided with a handle 62. This is preferably on the inside of the post, so that it can be easily reached by the driver through the opening in the partition 7. Fixed to the shaft 61 is a pair of cams 63 and 64 in engagement with oppositely disposed bars 65 and 66, on the outer ends of which are the bolts 10 and 11. Such bolts are beveled at their ends, so as to automatically enter openings in the top and bottom of the vehicle frame upon the post being returned to position therein. The bars 65 and 66 are held yieldably in extended position by means of coiled springs 67 and 68 held between abutments in said bars and small stops in the casing 60.

When it is desired to place a casket in the vehicle the door 16 is first opened, followed by the opening of the door 17 with the post 9 attached thereto, as in Fig. 2. The seat 6 is then turned forwardly out of the way, and, with the truck 21 in the position shown in Fig. 5, the hearse is arranged to receive a casket, indicated at 70 in Fig. 1. One end of the casket is placed on the truck and secured in place thereon, after which the truck and its burden are turned into the longitudinal position hereinbefore set forth. The momentum of the truck and its load is sufficient to effect the operation of the locking devices therefor, and simultaneously elevate the pins for the support of the projecting end of the casket. The truck 21 may be formed of any desired length, but it is preferably made sufficiently short so as not to project through the opening in the side of the hearse when in a loading position.

After the casket is placed in the hearse the door 17 and post 9 are returned to a closed position, after which the door 16 is closed. Access can then be had to the seat beside the driver by opening the door 17, without disturbing the post 9 or door 16, the door 17 being opened and closed in the same manner as if the post were solidly attached to the frame of the vehicle.

By the use of the present invention it is possible to place a casket therein or remove the same with the vehicle standing at the curb, or other place where it would be difficult to turn the vehicle in order to back it in. This also does away with the necessity of pall-bearers or others stepping into mud or snow in the street adjoining the curb, or in some drive-way in a cemetery.

What we claim, and desire to secure by Letters Patent, is:

1. In a hearse, the combination of: a body of sufficient size to allow a casket to be disposed therein in such a longitudinal position that the major axis of the casket is substantially parallel to the ground and to the line of motion of the hearse, said body having a door opening in a side thereof; cooperating carrier means between the casket and the hearse so constituted as to permit movement of the casket from said longitudinal position to a transverse position; mechanism provided to lock said carrier means from movement in said longitudinal position; release means for releasing said mechanism; and automatic means adapted to automatically move said casket from said longitudinal position toward said transverse position when said release means is actuated.

2. In a hearse, the combination of: a table provided with a system of slots; a casket carrier rollingly mounted on said table and provided with pins slidable in said slots, said slots being disposed to turn said carrier from a longitudinal position to a transverse position in its movement from one end of said table to the other; mechanism provided to lock said carrier from movement upon attaining a longitudinal position; release means for releasing said mechanism; and automatic means adapted to automatically move said carrier from said longitudinal position toward said transverse position when said reelase means is actuated.

3. In a hearse, the combination of: a table provided with a system of slots; a casket carrier rollingly mounted on said table and provided with pins slidable in said slots, said slots being disposed to turn said carrier from a longitudinal position to a transverse position in its movement from one end of said table to the other; a lever having a catch adapted to engage one of said pins when said carrier is in said longitudinal position so as to lock said carrier from movement; means for releasing said catch from engagement with said pin so as to permit said carrier to move freely on said table; and automatic means for automatically moving said carrier towards said transverse position when said catch is released.

4. In a hearse, the combination of: a table provided with a system of slots; a casket carrier rollingly mounted on said table and provided with pins slidable in said slots, said slots being disposed to turn said carrier from a longitudinal position to a transverse position in its movement from one end of said table to the other; a lever having a catch adapted to engage one of said pins when said carrier is in said longitudinal position so as to lock said carrier from movement; means for releasing said catch from engagement with said pin so as to permit said carrier to move freely on said table and spring actuated mechanism adapted to automatically move said carrier towards said transverse position when said catch is released.

5. In a device of the class described: a table provided with a system of slots; a carrier rollingly mounted on said table and provided with pins slidable in said slots; mechanism for locking said carrier from movement relative to said table; release means for releasing said mechanism so that said carrier may move freely on said table; and means adapted to automatically rotate said carrier about one of said pins when said release means is actuated.

6. In a device of the class described: a table provided with a system of slots; a carrier supported on said table and adapted to move from one end of said table to the other, said carrier being provided with pins slidable in said slots; mechanism for locking said carrier from movement on said table; release means for releasing said mechanism so that said carrier may move freely on said table; and means adapted to automatically move one of said pins longitudinally on said table and to rotate said carrier about the other of said pins during said longitudinal movement when said release means is actuated.

WILBUR MYERS.
FRANK THOMAS.